United States Patent [19]

Matoba et al.

[11] Patent Number: 4,961,944
[45] Date of Patent: Oct. 9, 1990

[54] PACKAGE FOR MICROWAVE OVEN COOKING AND METHOD OF USE

[75] Inventors: Takeji Matoba, Tokyo; Masahiro Morita, Uchigotakasakamachi, both of Japan

[73] Assignee: Gourmec Laboratory Co., Ltd., Japan

[21] Appl. No.: 246,944

[22] Filed: Sep. 20, 1988

Related U.S. Application Data

[63] Continuation-in-part of Ser. No. 847,537, Apr. 3, 1986, abandoned.

[30] Foreign Application Priority Data

Oct. 19, 1985 [JP] Japan .................. 60-232309
Jan. 14, 1986 [JP] Japan .................. 61-4269

[51] Int. Cl.$^5$ ............................................. B65D 81/34
[52] U.S. Cl. ................................ 426/107; 426/111; 426/113; 426/118; 426/127; 426/124; 426/396
[58] Field of Search ............ 426/107, 118, 113, 234, 426/243, 127, 111, 396, 412

[56] References Cited

U.S. PATENT DOCUMENTS

| | | | |
|---|---|---|---|
| 2,633,284 | 3/1953 | Moffett et al. | 426/118 |
| 2,807,550 | 9/1957 | Zarotschenzeff et al. | 426/118 |
| 3,432,087 | 3/1969 | Costello | 426/118 |
| 3,570,391 | 3/1971 | Rejlers | 426/234 |
| 3,716,180 | 2/1973 | Bemiss | 426/118 |
| 3,806,618 | 4/1974 | Bemiss | 426/118 |
| 3,851,574 | 12/1974 | Katz et al. | 426/107 |
| 3,873,735 | 3/1975 | Chalin et al. | 426/118 |
| 3,949,934 | 4/1976 | Goglio | 426/118 |
| 3,985,990 | 10/1976 | Levinson | 426/243 |
| 3,997,677 | 12/1976 | Hirsch et al. | 426/118 |
| 4,013,798 | 3/1977 | Goltsos | 426/118 |
| 4,015,085 | 3/1977 | Woods | 426/107 |
| 4,027,132 | 5/1977 | Levinson | 426/243 |
| 4,141,487 | 2/1979 | Faust | 426/118 |
| 4,210,674 | 7/1980 | Mitchell | 426/118 |
| 4,261,504 | 4/1981 | Cowan | 426/118 |
| 4,358,466 | 11/1982 | Stevenson | 426/118 |
| 4,390,554 | 6/1983 | Levinson | 426/107 |
| 4,404,241 | 9/1983 | Mueller et al. | 426/118 |
| 4,419,373 | 12/1983 | Oppermann | 426/118 |
| 4,567,341 | 1/1986 | Brown | 426/118 |
| 4,571,337 | 2/1986 | Cage et al. | 426/118 |
| 4,592,914 | 6/1986 | Kuchenbecker | 426/118 |
| 4,596,713 | 6/1986 | Burdette | 426/107 |
| 4,640,838 | 2/1987 | Isakon et al. | 426/118 |

OTHER PUBLICATIONS

Condensed Chem. Dict., 8th Ed., Hawley, Van Nostrand Reinhold, 1971, p. 628.

Primary Examiner—Steven Weinstein
Attorney, Agent, or Firm—Stephen F. K. Yee

[57] ABSTRACT

A food package for cooking of the food in a microwave oven is formed of a heat-resistant synthetic resin impermeable to oil and moisture and has at least one opening for allowing steam to escape when the internal pressure in the package is increased beyond a certain value by the steam generated during heating. The number of openings and the size of each opening are selected with consideration of the package volume or size and the type of food to be packaged so as to adjustably maintain within the package a pressure and a temperature each of which are within a range of predefined values during cooking in the oven. The package distends with increase of the internal pressure to provide a visual indication that cooking is complete. A method of cooking the packaged food comprises using the described package which adjustably maintains the internal pressure in the package within the range of about 1.00 to about 1.15 atm and the temperature within the range of about 100° to about 105° C. The steam is allowed to escape through the opening for a period of about 1 to about 10 seconds.

4 Claims, 6 Drawing Sheets

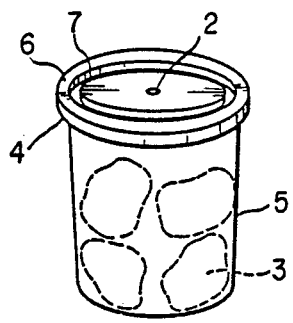
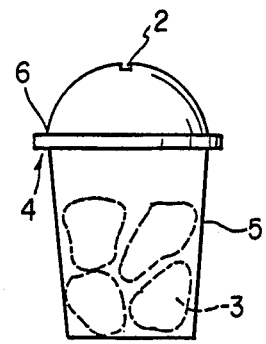
FIG. 2(a)　　　　FIG.2(b)
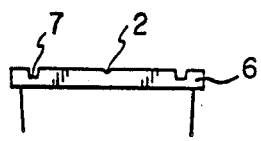
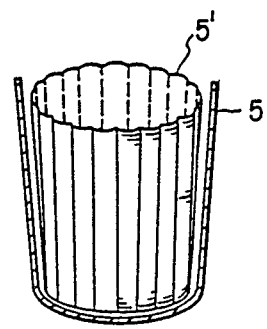
FIG. 3(a)　　　　FIG. 3(b)

PACKAGE FOR MICROWAVE OVEN COOKING AND METHOD OF USE

CROSS REFERENCE TO RELATED APPLICATION

This application is a continuation-in-part of pending application Ser. No. 847,537, filed on Apr. 3, 1986 and now abandoned.

BACKGROUND OF THE INVENTION (1) Technical Field

The present invention relates to a food receptacle or package for electronic oven cooking and a method for cooking the food by using the same. More particularly, it relates to a food receptacle for electronic oven cooking which comprises at least one steam controlling opening for adjustably maintaining the an internal pressure in the receptacle within a particular range and a method for cooking the food by using the same.

(2) Background Information

At present, frozen foods are widely cooked by using electronic, or microwave, ovens. However, satisfactory results can not be obtained because the cooked food becomes harder due to excessive time of cooking or, in contrast with this, the food is insufficiently thawed by too short time of cooking, even if the electronic oven is set at a time and a temperature indicated on the commercial frozen food package.

These disadvantages in electronic oven cooking are considered to be induced by the following causes:

(1) Electronic ovens are largely different from one another in mechanism of electron radiation, in shape of an angular portion and in range thereof.

(2) The temperatures of chilled or cold foods vary from −25° C. to +10° C., according to whether the foods have been placed in a large-sized cold storage facility or a refrigerator car, a place where a freezing chamber is located, or a condition where the foods are permitted to stand before use. There is an extremely large difference between the dielectric constant of food moisture in the glacial (frozen) state and the dielectric constant of food moisture in the aqueous (liquid) state.

(3) Generally, the frozen foods are also different from one another in moisture content, in oil content and in the other constituents. Particularly, in the glacial state of the food moisture, greatly different electronic oven heating conditions are required.

In addition to the above three causes, the following two causes are cited.

(4) In conventional cooking, the results are little affected by a difference of 5 to 10 minutes in cooking time. In electronic oven cooking, however, the difference of 10 to 20 seconds in cooking time may result in cooked food which is still cold, hard and dry due to excess moisture release, etc.

(5) In conventional electronic oven cooking, the electronic oven must be set for the time indicated for the frozen food as a rough approximation of the cooking time. However it is difficult to cook the frozen food properly for the reasons described above.

The food holding table of the electronic oven can not be uniformly heated. The table includes portions which are increased in temperatures by the electronic oven heating, and portions which do not undergo the electronic oven heating and are therefore not appreciably increased in temperatures. Consequently, different times are required for cooking suitably, depending upon portions of the table where the food is placed. Further, the radiation heating parts are entirely different from one another in shape of the radiation surface and in range, according to types of the electronic ovens. the times for defrosting and cooking vary, according to the kinds of the frozen foods. Even for the same kind of foods, appropriate times for defrosting and cooking vary according to amounts of the components contained in the frozen foods, such as moisture and oil. These different conditions cause variations in the results. Accordingly, it has been impossible to expect cooking results which are always satisfactory.

Describing the present situation of the cooked and half-cooked (or partially-cooked) frozen foods, as the conventional frozen foods, there are typically mentioned meat, fishes and shellfishes coated with flour ready for frying, a hamburger steaks and meat balls ready for grilling, and the like. There are also included vegetables such as corn, onion, potato and the like, either sliced or not, raw or partially cooked. All these frozen foods are, however, thawed once and there after fried, grilled or steamed once again, and they can not be eaten directly by thawing and heating in the electronic oven.

In the case that the already cooked frozen food is thawed and heated in the electronic oven, if fried frozen food with flour coating is entirely thawed, the moisture in the flour coating is evaporated, because dish-like open vessels made of glass or ceramic materials are commonly used.

Consequently, the food becomes harder and has an entirely different texture. In addition, the oil comes up to the surface of the food and thereby the balance of taste is lost. When grilled frozen food is thawed and heated in the electronic oven, the oil melted out of the food similarly gathers of the surface of the food, resulting in stickiness of the surface. Further, the surface of the food becomes harder and crumbly to give a different texture by heating the food for a longer period of time, although the frozen food can be entirely thawed. Furthermore, the frozen food which was boiled and sliced can be heated in the electronic oven without hindrance, if the heating is carried out after the food has been thawed. If the food is heated in the form of a frozen block, the outer portion thereof will be scorched while the inner portion thereof remains frozen. The higher the moisture content in the food, in other word, the more frozen moisture portions are contained in the food, the more this trend is pronounced. These are due to a significant difference between the dielectric constants of frozen parts and aqueous parts. This difference in dielectric constant is caused by quick loss of the moisture in the outer portion of the food, when the food is heated in the electronic oven, that is to say, by lack of moisture evaporation balance between the outer portion and the inner portion of the food. This is responsible for deterioration of the food quality. Because of these drawbacks, the cooked frozen foods have been limited to extremely few kinds. Niku-mans (meat buns), an-mans (bean-jam buns), shao-mais and gyozas have been naturally defrosting or rendered into a chilled state in a refrigerator from the frozen state, and thereafter the electronic oven has been used only for heating them. The frozen foods have seldom been directly treated in the electronic oven. Usually the frozen shao-mais are heated in the electronic oven after placing the frozen shao-mais on a dish, adding a predetermined amount of water thereto and covering the shao-mais with a wrapping film. In this method, the capabilities of the electronic oven are not sufficiently utilized. At present, the electronic oven is utilized only for minor purposes such as heating of sake, milk, wet towels and the like or defrosting of frozen cuttlefishes and prawns. The electronic oven was originally provided for the purpose of cooking the already-cooked, namely fried or grilled, frozen food such as fried meat, fishes and shellfishes with flour coating and grilled hamburgers. There are currently not available, however, already-cooked frozen foods packed in receptacles ready for electronic oven heating. The frozen foods presently available at shops are packed in ordinary paper dishes or paper boxes. The foods available for electronic oven heating are sold in the refrigerated condition because the frozen foods have the drawbacks noted hereinbefore. Foods which have been transported frozen are thawed before heating in the electronic oven. This is not a procedure in which the foods are directly cooked from the frozen state, and therefore the original purpose of the electronic oven is not fulfilled.

Moreover, the heating of the foods in the electronic oven is usually carried out in containers made of glass or ceramic materials. In this case, oil and moisture released during heating of fried or grilled oil-containing foods, such as chicken nuggets and hamburgers, adhere to the finger when the foods are removed from the containers, or to the containers and the oven surfaces. This is messy, and the heating container and oven must be cleaned. To overcome these defects, paper or a paper container is usually used to absorb the oil and moisture. All of the problems, however, have not been completely solved.

Thus, the electronic oven can not be fully utilized for its intended purpose for the reasons described above. More particularly, accurate measures of the required cooking times of the electronic oven can not be known and a difference of 10 to 20 seconds in cooking time can drastically alter the texture and the taste of the resulting food. These are the main reasons that the electronic oven, which should be highly convenient, has not been utilized for cooking the various foods and the availability of pre-packed, frozen cooked foods has been limited.

SUMMARY OF THE INVENTION

It is therefore a primary object of the present invention to provide a food package for electronic oven cooking which makes it possible to cook the food suitably, regardless of the differences in types of electronic ovens and the kinds of frozen foods, as described above, when the frozen food is cooked in the electronic oven.

It is a further object of the present invention to provide a method for cooking the food by using the package described above.

For the purpose of achieving the above-mentioned objects, the inventors have studied various available food packages used for electronic oven cooking. As a result, it has been found that the problems described above are solved by using a receptacle having at least one steam controlling opening for allowing steam to escape when the internal pressure is increased during electronic oven heating of the food, thus arriving at the present invention.

In accordance with the present invention, there are provided a food receptacle for electronic oven cooking which comprises at least one steam controlling opening for allowing steam to escape when the internal pressure in the receptacle is increased beyond a certain value by the steam generated during electronic oven heating of the food; a food receptacle for electronic oven cooking which comprises at least one steam controlling opening formed in such a manner that the internal pressure in the receptacle is adjustably maintained within a range of about 1.00 to about 1.15 atm and the temperature in the receptacle is adjustably maintained within a range of about 100° to about 105° C., during the electronic oven heating of the food; a food receptacle for electronic oven cooking which is inflatable with the increase of the internal pressure induced by the steam generated therein during the electronic oven heating of the food, and comprises at least one steam controlling opening for allowing steam to blow off therethrough when the internal pressure is increased beyond a certain value by the steam generated during the electronic oven heating of the food; a method of electronic oven cooking which comprises using the food receptacle for electronic oven cooking, said receptacle having at least one steam controlling opening for allowing steam to blow off therethrough when the internal pressure in the receptacle is increased beyond a certain value by the steam generated during the electronic oven heating of the food, and adjusting the internal pressure in said receptacle to the range of about 1.00 to about 1.15 atm and the temperature in said receptacle in the range of about 100° to about 105° C., thereby cooking the food by electronic oven cooking; and a method of electronic oven cooking which comprises using the food receptacle for electronic oven cooking, said receptacle being inflatable with the increase of the internal pressure induced by the steam generated therein during the electronic oven heating of the food and having at least one steam controlling opening for allowing the steam to blow off therethrough when the internal pressure in said receptacle is increased beyond a certain value by the steam generated during the electronic oven heating of the food, and allowing the steam to blow off through the steam controlling opening for a period of about 1 to about 10 seconds, thereby cooking the food by electronic oven cooking.

BRIEF DESCRIPTION OF THE DRAWINGS

FIG. 2(a) is a schematic perspective view showing a cup-shaped food receptacle for electronic oven cooking of the present invention before cooking;

FIG. 2(b) is a schematic side view showing a cup-shaped food receptacle for electronic oven cooking of the present invention during and after cooking;

FIG. 3(a) is a schematic sectional view showing a lid of a cup-shaped food receptacle of the present invention;

FIG. 3(b) is a schematic perspective view, partly in section, showing a double cup-shaped food receptacle of the present invention;

DESCRIPTION OF THE PREFERRED EMBODIMENTS

Figure 1A:
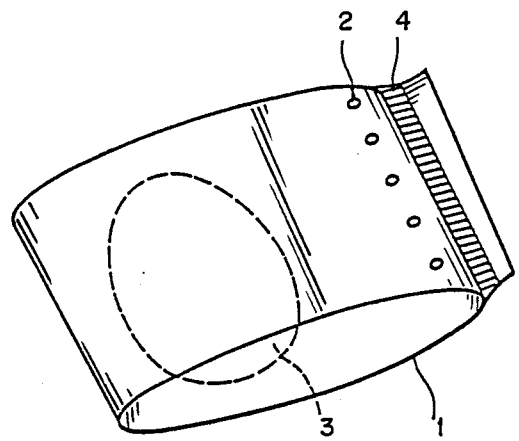
FIG. 1(a) is a schematic perspective view showing a bag-shaped food receptacle for electronic oven cooking of the present invention before cooking.

The food receptacle according to the present invention may have any shape such as a bag, a cup or a tray, so long as it can contain the food and can be sealed.

In the present invention, it is important that the receptacle has at least one steam controlling opening extending through the thickness of the receptacle material, from the inside to the outside of the receptacle or package for allowing steam to blow off therethrough when the internal pressure in the receptacle is increased by the steam generated by electronic oven heating of the food packed in the receptacle.

The internal pressure in the receptacle is preferably maintained in the range of about 1.00 to about 1.15 atm during heating of the food, and the temperature in the receptacle is preferably maintained in the range of about 100° to 105° C.

If the frozen food is cooked in the electronic oven at an internal pressure of less than 1.00 atm for a shorter period of time, frozen parts sometimes remain in the cooked food because of the difference in dielectric constant of the frozen parts. On the other hand, if an internal pressure of at least 1.15 atm and a temperature of at least 105° C. are used, the receptacle may rupture, and controlled cooking conditions are not possible. It therefore becomes necessary to use a very high pressure-resistant and heat-resistant material for the receptacle, which will increase the material cost.

When the receptacle is used which is inflatable, or distends, with the increase of the internal pressure and can maintain the internal pressure constant by moisture evaporation balance, the degree of inflation of the receptacle can provide a reasonably reliable indicator showing the completion of cooking of the food.

The microwaves emitted from the electronic oven are absorbed in the food and vibrate the molecules in the food to generate frictional heat. Frozen food is thawed by the frictional heat thus generated. This procedure can be carried out in an atmosphere of uniform steam pressure by adjusting the steam pressure in the receptacle during the electronic oven heating. On the other hand, when the frozen food is heated for defrosting in an open atmosphere in which an internal pressure of steam is not produced, the electronic oven heating of the food is carried out after defrosting the frozen food by letting it stand. The overall time of the procedure, however, is from 10 to 20 times that of the present invention. Moreover, in the conventional method, the food is heated for defrosting at 100 W successively, and thereafter heated at 500 W. The time required is from 3 to 4 times that of the present invention. Furthermore, the resulting cooked food according to the conventional method is extremely inferior in texture and taste, and can not be accepted as a satisfactorily cooked food. According to the present invention, frozen food can be satisfactorily cooked for a shorter period of time, and especially the time reduction effect is remarkable when frozen food in the glacial state which has an extremely low dielectric constant is defrosted. Further, the selection of the steam pressure makes it possible to maintain taste of the food constant.

The steam controlling opening for adjusting the steam pressure in the receptacle may be formed at any location on the receptacle. The size, shape and number of the steam controlling opening can be determined from the size or the volume of the receptacle and the kind of food to be cooked or the moisture content included in the food, particularly from the amount of frozen parts which have an extremely low dielectric constant. Although fine adjustment is required, of course, for each food according to the constituents of the food, such as hydrocarbons, proteins, ashes and oils, a bag-type receptacle which is usually 80 mm by 180 mm in dimensions and 300 cc in total volume, not including the edge portions, may have 3 to 6 openings, each being from 0.5 to 2 mm in diameter. For a cup- or tray-type receptacle being 300 cc in inner volume, 3 to 6 openings each having a diameter of 0.5 to 2 mm provide good results.

As shown by the Examples considered below, a receptacle according to the invention which has an inner volume of approximately 300 cc. and from 1 to 6 steam controlling openings, each opening being from 0.5 to 2 mm in diameter will, during heating in a microwave oven, adjustably maintain the pressure in the receptacle within a range of 1.00 to 1.15 atm and the temperature within a range of 100° to 105° C. These cooking conditions coupled with a steam-venting period of not more than 10 seconds, result in cooked food of good quality. This relationship of the number and size of the openings per specific volume of receptacle has been determined to be generally applicable for a wide range of foods customarily packaged for heating and cooking in a microwave oven.

The shape of the steam controlling opening is usually circular. The receptacle, however, may be provided with an x-shaped or v-shaped cut which forms the opening by being pushed up by steam pressure.

A single bag may be perforated after it is made by metal needles or heated metal needles which are movable up and down to form the openings. For mass production, wherein the bags are automatically prepared and filled in a continuous process, the bags may be perforated by means of the aforesaid needles during movement of the appropriate process machinery, prior to the food being packaged.

The steam controlling opening may be covered with a seal or a wrapper, whereby the frozen food can be prevented from moisture evaporation while frozen as well as being maintained under good sanitary conditions. When it is cooked in the electronic oven, the seal or the wrapper is removed to uncover the steam controlling opening. Instead of the opening, a control valve for adjusting the internal pressure in the receptacle may be provided. Because the steam controlling opening can be covered with the seal or the wrapper, for example, a salt or pH stabilizer can be added to the food packed in the receptacle as generally practiced, or the packed food can be sterilized by heating it in the electronic oven as sometimes practiced, through the steam controlling opening, for storage or transfer. This receptacle can be utilized for packing the food sterilized for long-period storage by a high-pressure or low-pressure retort sterilizing process in the sterilized receptacle. The receptacle may be composed of a retort-resistant material and the steam controlling opening can be formed after the retort sterilizing treatment.

It is apparent from all experiments of the cooked foods that the steam controlling opening formed on the receptacle of the present invention result in remarkable reduction in electronic oven heating time. Further, it became apparent from the detailed experiments that the amount of steam generated during the electronic oven heating and the times taken until the steam was generated varied with the temperature and the kind of food packed in the receptacle, and with the size of the steam controlling opening. For all foods, when steam was allowed to blow off through the steam controlling opening for a period of not more than about 10 seconds, preferably 3 to 8 seconds, the taste, the flavor and the texture, were best. When the mechanism of the present invention is not applied, a longer period of time is required for defrosting and the satisfactorily cooked food can not be obtained. When the steam blowing-off time exceeds the time described above, for example, when the time exceeds about 5 seconds for chicken nuggets, the taste and flavor are deteriorated and the texture becomes harder and too dry.

On the other hand, immediately before blowing off of steam, the packed food is entirely defrosted, but it feels lukewarm and has a different texture. When the steam blowing-off time exceeds 10 seconds, the taste and flavor deteriorated as a matter of course and the softness of the meat and the flour coating are lost.

This shows that the electronic oven heating time is extremely short, for example several minutes, compared with the boiling, the grilling, the steaming and the like which have generally been carried out by using charcoal fire, gas fire, electric heat and the like, so that the taste, the flavor and the texture are influenced by a time lag of several seconds in the final cooking stage. This is new information first found by the present inventors. That is to say, it was found that the electronic oven cooking could not be suitably carried out for each type of food by the conventional rough push button system of setting the time of the electronic oven, because a time lag allowable for the termination of electronic oven heating is extremely narrow, and that particularly for the foods having the taste, the flavor and the texture already completed such as the cooked foods, this tendency was pronounced.

The cooking of all foods is terminated after steam is allowed to blow off for a period of not more than 10 seconds, preferably for a period of 3 to 8 seconds. Therefore, the steam blowing-off time can be taken as an indicator of the termination of the cooking, and anyone can satisfactorily cook various foods with the electronic oven with ease.

To terminate the electronic oven heating after steam is allowed to blow off for a period of not more than 10 seconds, preferably for a period of 3 to 8 seconds, there can be applied a method in which the degree of the inflation of the receptacle is confirmed by visual observation, a method in which the steam blowing-off time is perceived by a moisture sensor mounted in the electronic oven, and the electronic oven heating is automatically terminated thereby, and so on.

In cooking, it is sometimes preferable to supply an amount of water released from the food during the electronic oven heating, whereupon better taste can be maintained by the supply of water.

The receptacle of the present invention is composed of a synthetic resin which is heat-resistant (at least 110° C.) and is not permeable to oil and moisture. Suitable synthetic resins includes polyesters such as polyethylene terephthalate, polyamides such as nylon 6 and nylon 66, polyimides, polyamideimides, polypropylene such as drawn or undrawn polypropylene (OPP or CPP), heat-resistant polyethylene such as high density polyethylene (HD), medium density polyethylene (MD) and low density polyethylene (LD), mixtures thereof, and the like. Glass and ceramics can also be used for the receptacle.

Figure 7:
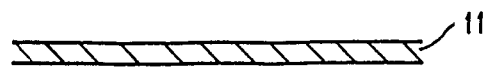
FIG. 7 is a schematic sectional view showing a sheet or film of a single layer of a synthetic resin which is used for a receptacle of the present invention.
Figure 8:
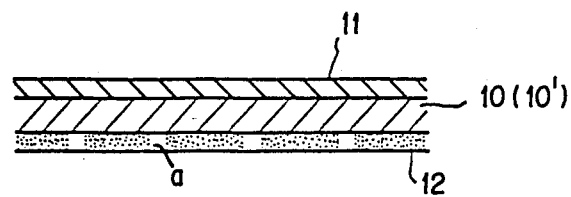
FIGS. 8 to 10 are schematic sectional views each showing a laminated sheet or film of a synthetic resin which is used for a receptacle of the present invention.
Figure 9:
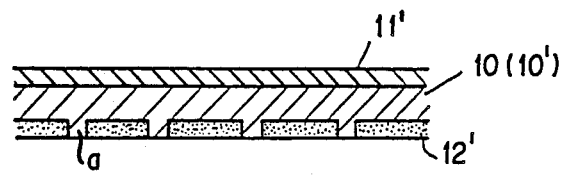
Figure 10:
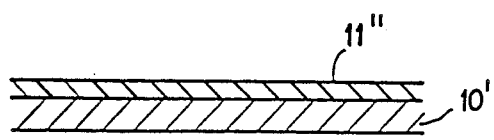
Figure 11:
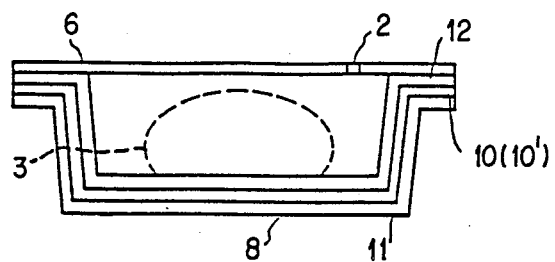
FIG. 11 is a schematic sectional view showing a tray-shaped food receptacle of the present invention.
Figure 12:
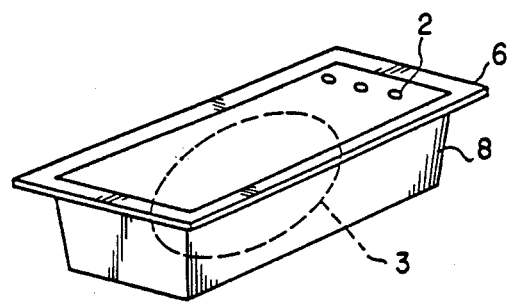
FIGS. 12 and 13 are schematic perspective views each showing a tray-shaped food receptacle of the present invention.
Figure 13:
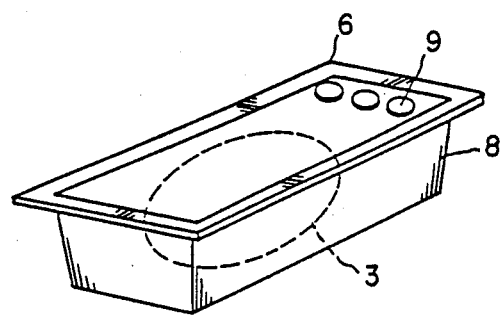

The synthetic resin can be used in the form of a film or sheet of a single layer as shown in FIG. 7, or a laminated film or sheet of multiple layers as shown in FIGS. 8 to 10.

When the receptacle is used for frozen or chilled food, the receptacle is preferably prepared from a laminated sheet or film comprising three layers, namely, outer and inner layers of the synthetic resin film described above and an intermediate layer of paper or nonwoven fabric, or a laminated sheet or film comprising two layers, namely an outer layer of the synthetic resin film described above and an inner layer of nonwoven fabric, which receptacle was proposed by the present inventors in copending U.S. patent application Ser. No. 814,973, now abandoned.

A receptacle comprising the synthetic resin film bonded on a paper vessel by a hot pressing method and so on can also be used.

One embodiment of the above-mentioned laminated sheet is a sheet of three layers, as shown in FIGS. 8 and 9, wherein the outer layer 11 or 11' is composed of the heat-resistant synthetic resin film not permeable to oil and moisture, the intermediate layer 10 or 10' is composed of paper or nonwoven fabric having oil and moisture absorptive properties, and the inner layer 12 or 12' is composed of the heat-resistant synthetic resin film having small openings "a" through which oil and moisture released from the food during heating are allowed to pass through by the capillary phenomenon. The intermediate layer of paper or nonwoven fabric may be provided with small openings for enhancing the capillary phenomenon described above. Another embodiment of the laminated sheet is a sheet of two layers, as shown in FIG. 10, wherein the outer layer 11" is composed of the heat-resistant synthetic resin film not permeable to oil and moisture, and the inner layer 10' is composed of nonwoven fabric such as a sheet prepared by pressing and heat bonding mixed web of moisture and oil-absorptive fibers and synthetic resin fibers. The receptacle of the present invention can be prepared from these laminated sheets or films, and the electronic oven cooking of the present invention can be carried out by using such a receptacle.

Further, the cup or tray having such a sheet of three layers or two layers with which the bottom thereof is covered can be used as the receptacle of the present invention.

The receptacle of the present invention can be prepared from the single sheet or film or the laminated sheet or film of the heat-resistant synthetic resin described above. Exemplifying the combination of the outer layer-the intermediate layer-the inner layer as the laminated sheets used in the present invention, there are mentioned a polyester-paper or nonwoven fabric-polyethylene, a polyester-paper or nonwoven fabric-a polyamide, a polyester-paper or nonwoven fabric-a polyimide, a polyester-paper or nonwoven fabric-polypropylene, a polyester-paper or nonwoven fabric-a polyester, a polyamide-paper or nonwoven fabric-polyethylene, a polyamide-paper or nonwoven fabric-a polyester, a polyamide-paper or nonwoven fabric-polypropylene, a polyamide-paper or nonwoven fabric-a polyimide, a polyamide-paper or nonwoven fabric-a polyamide, a polyimide-paper or nonwoven fabric-polyethylene, a polyimide-paper or nonwoven fabric-a polyester, a polyimide-paper or nonwoven fabric-a polyamide, a polyimide-paper or nonwoven fabric-a polyimide, polypropylene-paper or nonwoven fabric-polypropylene, a polyimide-paper or nonwoven fabric-a polyethylene, polypropylene-paper or nonwoven fabric-polyester, polypropylene-paper or nonwoven fabric-a polyamide, polypropylene-paper or nonwoven fabric-polypropylene, a polyester-nonwoven fabric, polypropylene-nonwoven fabric, a polyamide-nonwoven fabric and the like.

These laminated sheets can be utilized as the whole or a part of the receptacle. For example, in the case of the cup or the tray, the laminated sheets may be used only for the body and another material may be used for the lid. Further, the sheet described above can be used only for the bottom.

The receptacle prepared from the materials described above are inflatable by the steam pressure generated by the electronic oven heating, and the steam is advantageously allowed to blow off through the steam controlling opening of the receptacle. Moreover, oil and moisture released from the food are suitably absorbed in the moisture- and oil-absorptive paper or nonwoven fabric of the intermediate layer (in the case of the laminated sheet of three layers) or in the nonwoven fabric of the inner layer (in the case of the laminated sheet of two layers). Therefore, oil does not remain on the surface of the food, and accordingly the resulting food is not different from food cooked in the usual manner both taste and texture.

The foods utilized in the present invention include frozen foods and chilled foods, and particularly cooked foods which have not been able to be deliciously cooked by conventional electronic oven heating, for example, the oil containing foods such as chicken nuggets, hamburgers and pork cutlets, chow mein, frizzled noodle, spaghetti and the like are preferably mentioned. However, the method of the present invention can be applied to steam cooking not only of these foods, but also of uncooked foods such as meat and fishes.

The present invention relates to the food receptacle for electronic oven cooking which comprises a steam controlling opening for allowing steam to blow off therethrough when an internal pressure in the receptacle is increased beyond a certain value by the steam generated on electronic oven heating of the food. The internal pressure in the receptacle can be adjustably maintained within the range of about 1.00 to about 1.15 atm and the temperature in the receptacle can be adjustably maintained within the range of about 100° to about 105° C. Further, the receptacle is inflatable by the increased internal pressure. The steam is allowed to blow off through the steam controlling opening for a period of not more than about 10 seconds, and thereafter the heating is stopped.

By these feature, raw foods, as well as frozen and chilled foods, can be deliciously cooked in a short period of time, without regard to the types of electronic ovens, the portions in the electronic oven where the food is placed in the oven, the kinds of foods, and the differences in moisture and oil contents of the foods.

Further, the completion of the cooking can be confirmed by observing the inflation of the receptacle, as well as by the blowing-off time of the steam. The cooking operation is therefore extremely simple and easy.

The present invention will now be described in detail with reference to the following examples that by no means limit the scope of the invention.

EXAMPLE 1

Bag-shaped and box-shaped receptacles were prepared from a laminated sheet of three layers. An inner layer which was in direct contact with food was constituted by a 0.04 mm-thick heat-resistant polyethylene (HD) film for food-packing use, which had a heat resistance of 125° to 135° C. and openings of 0.01 mm diameter arranged at intervals of 1 mm in longitudinal and transversal directions. An intermediate layer was constituted by Japanese paper of an amount of 30 g/m$^2$ and an outer layer was constituted by a 0.05 mm-thick polyethylene terephthalate film having a heat resistance of 260° C. and being not permeable to moisture and oil. These receptacles were provided with small steam controlling openings which adapted to the amount of moisture evaporated from the sealed frozen food. The number of the openings was 6 and each of openings had a diameter of 1 mm. In the case of the box-shaped receptacle, the openings were formed in the neighborhood of the top seal portion. The bag-shaped receptacle was 80 mm by 180 mm in dimensions.

Pork cutlets and green soybeans sealed in bag-shaped receptacles described above were cooked as follows. Both foods were held frozen at a temperature of −35° C. overnight and then heated in an electronic oven. The bag containing the pork cutlets was inflated after the lapse of 90 seconds, and surplus steam was released through the steam controlling openings, whereupon the pressure in the bag was 1.074 atm and the temperature was 102° C. When the heating was stopped after the steam was allowed to blow off through the openings for 2 minutes, the inflated bag immediately returned to its original state. The mixture of oil and moisture rather rich in oil was absorbed in the moisture- and oil-absorptive paper of the intermediate layer by the capillary phenomenon through the small openings formed in the inner layer. The coating of the resulting cutlets was soft. This was due to the oil and moisture content in an equilibrium moisture state inside the bag obtained as a result of control by the steam controlling openings. When the cutlets were taken out immediately after the heating, they had a feel just like they were steamed, but they had no surface oil. When they were left for 10 minutes, both moisture and oil were absorbed in the coating so that they were stabilized. Their taste and texture were close to those of pork cutlets just after being fried.

The green soybeans, which were boiled, were uniformly steamed by the equilibrium moisture content in the bag induced by the penetrating function of moisture into the moisture- and oil-absorptive paper through the capillary phenomenon and the function of the steam controlling openings which number was three times that of the openings in the case of the cutlets. This effect was combined with the heating effect of the electronic oven. The bag was inflated after the lapse of 100 seconds, and the steam was simultaneously allowed to blow off through the steam controlling openings for 5 seconds, whereupon the pressure in the bag was 1.074 atm and the temperature was 102° C. The food taken out after being heated for a period of 90 seconds did not substantially differ from that prepared by heating with hot water for a period of 10 minutes.

Similar results could be obtained in the cases of chicken nuggets and hamburger steaks without sauce.

With respect to the box-shaped receptacle, the same results as those in the case of the bag described above could be obtained. The box-shaped receptacle was particularly suitable for the electronic oven cooking of the already-cooked frozen foods such as chow mein, spaghetti, frizzled noodle, frizzled boiled rice, boiled rice containing green peas and the like.

In the case of the bag, the food contained therein is compressed. The box-shaped receptacle, however, can prevent the food from being compressed and the food can be kept soft and full. Therefore, the commercial value of the food is effectively heightened.

EXAMPLE 2

Bag-shaped and box-shaped receptacles were prepared from a laminated sheet of three layers. An inner layer which was in direct contact with food was constituted by a 0.04 mm-thick heat-resistant polyethylene (HD) film for food-packing use, which had a heat resistance of 125° to 135° C. and openings of 0.01 mm diameter arranged at intervals of 1 mm in longitudinal and transversal directions. An intermediate layer was constituted by nonwoven fabric comprising paper and polyethylene of 80 g/m² and an outer layer was constituted by a 0.05 mm-thick polyethylene terephthalate film having a heat resistance of 260° C. and being impermeable to moisture and oil. These receptacles were provided with small steam controlling openings which adapted to the amount of moisture evaporated from the sealed frozen food. The number of the openings was 6 and each of openings had a diameter of 1 mm. In the case of the box-shaped receptacle, the openings were formed in the neighborhood of the top seal portion. The bag-shaped receptacle was 80 mm by 180 mm in dimensions.

Pork cutlets and green soybeans sealed in the bag-shaped receptacle described above were cooked as follows. Both foods were held frozen at a temperature of −35° C. overnight and then heated in an electronic oven. The bag containing the pork cutlets was inflated after the lapse of 90 seconds, and surplus steam was released through the steam controlling openings, whereupon the pressure in the bag was 1.074 atm and the temperature was 102° C. When the heating was stopped after the steam was allowed to blow off through the openings for 2 seconds, the inflated bag immediately returned to its original state.

The mixture of oil and moisture rather rich in oil was absorbed in the moisture- and oil-absorptive nonwoven fabric of the intermediate layer by the capillary phenomenon through the small openings formed in the inner layer. The coating of the resulting cutlets was soft. This was due to the oil and moisture content in an equilibrium moisture state inside the bag obtained as a result of control by the steam controlling openings. When the cutlets were taken out immediately after the heating, they had a feel just like they were steamed, but they had no surface glittering with oil. When they were left for 10 minutes, both moisture and oil were absorbed in the coating so that they were stabilized. Their taste and texture were close to those of cutlets just after being fried. Also with reference to green soybeans, chicken nuggets and hamburger steaks without sauce, almost the same results as those in Example 1 were obtained.

In regard to the box-shaped receptacle, the same excellent results as those in the case of the bag described above could be obtained as described in Example 1.

EXAMPLE 3

A cup-shaped receptacle was prepared from a laminated sheet of three layers which comprises a polyester film, paper and polyethylene film having openings. The receptacle was 250 cc in volume and had steam controlling openings of 1.0 mm in diameter. Using this receptacle, various cooked foods were cooked by an electronic oven according to the conditions shown in Table 1 below. On the cooking, 5% of moisture content was supplied to the cooked foods. An electronic oven of 700 W was used. The results were shown in Table 1 described below.

TABLE 1

| Kind of cooked food | Number of controlling openings | Heating time in electronic oven (seconds) | In receptacle Temperature (°C.) | In receptacle Pressure (atm) | Blow-off time of steam (seconds) | Judgement | Brief comment of taste estimation on food after cooked |
|---|---|---|---|---|---|---|---|
| Chicken nuggets | 3 | 110 | 102 | 1.074 | 3 | O | Good |
| | 3 | 115 | 103 | 1.109 | 8 | | Feel watery |
| | 3 | 120 | 103 | 1.110 | 13 | X | Hard and inferior in feel to mouth |
| | 2 | 110 | Cracked at openings | | 1 | X | |
| | 3 | 110 | 98 | 0.931 | Very short | X | Center portion was cold |
| Green soybeans | 6 | 95 | 98.5 | 0.948 | Very short | X | Center portion was cold |
| | 6 | 105 | 102 | 1.074 | 5 | O | Good |
| | 6 | 110 | 103.5 | 1.126 | 10 | X | Smell of scorching from outer surface |
| | 4 | 95 | Cracked at openings | | | X | Center of bean was cold |

TABLE 1-continued

| Kind of cooked food | Number of controlling openings | Heating time in electronic oven (seconds) | In receptacle Temperature (°C.) | Pressure (atm) | Blow-off time of steam (seconds) | Judgement | Brief comment of taste estimation on food after cooked |
|---|---|---|---|---|---|---|---|
| Small size pork cutlets | 3 | 85 | 99 | 0.965 | Very short | X | Center portion was lukewarm |
| | 3 | 95 | 102 | 1.074 | 3 | O | Good |
| | 3 | 105 | 103 | 1.109 | 13 | | Moisture content of coating was insufficient |
| Pilaff | 4 | 120 | 98 | 0.931 | Very short | X | Some parts were cold |
| | 4 | 130 | 101 | 1.036 | 5 | O | Good, soft and full |
| | 4 | 140 | 103 | 1.109 | 15 | | A part of rice grains was tough |
| Takoyaki (Octopus pudding) | 5 | 95 | 99 | 0.965 | Very short | X | Center portion was lukewarm |
| | 5 | 105 | 101 | 1.036 | 3 | O | Good |
| | 5 | 115 | 103 | 1.109 | 13 | | Surface was dry |
| Hot cake | 5 | 40 | 98 | 1.036 | 3 | O | Good, soft and full |
| | 5 | 50 | 102 | 1.074 | | O | Good, generally rather hard |

In table 1, hot cake was the chilled type, stored at +8° C., and the others were the cold type, stored at −20° C.
O: Good, :Fair, X: Poor As can be seen from Table 1, good cooked foods can be obtained when the foods are heated by the electronic oven at temperatures in the receptacles of at least 100° C., at pressures of 1.00 to 1.15 atm, for periods of 1.5 to 3 minutes. Particularly, it is undesirable to heat the food at a pressure of less than 1.0 atm, because the center portion of the food is insufficiently heated and is cold or lukewarm. When the pressure increases beyond 1.15 atm, the receptacle is cracked at the controlling opening. Further, in the bag-shaped receptacle, the seal portion is broken, and in the cup- or tray-shaped receptacle, the seal portion between the body and the upper lid is broken.

The receptacle constituted by a material able to resist a pressure of 1.15 atm undesirably results in the unbalance of evaporated moisture and the deterioration of the food compositions, particularly proteins.

EXAMPLE 4

Embodiments of electronic oven cooking by using various kinds of receptacles will be shown hereinafter.

(1) An example of a bag

Figure 1B:
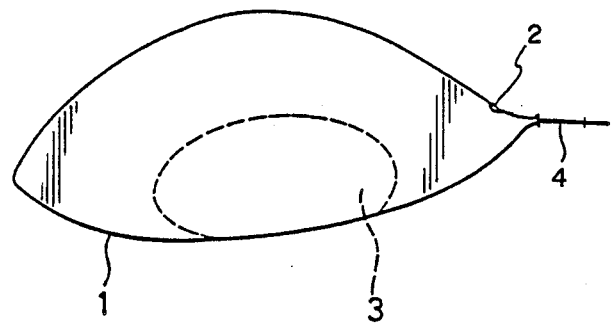
FIG. 1(b) is a schematic side view showing a bag-shaped food receptacle for electronic oven cooking of the present invention during and after cooking.

A bag 1 is sealed after food 3 is placed therein (FIG. 1(a)). The bag 1 is provided with steam controlling openings 2, the number of openings depending upon the kinds of foods for cooking, considering the constituents of the foods such as moisture and oil. The steam controlling openings 2 are formed in such a manner that an internal pressure in the atmosphere of steam released from the food 3 packed in the bag 1 can be adjusted to the range of about 1.00 to 1.15 atm (100° to 105° C. in temperature). To be more specific, usually the bag 1 is 350 cc in inner volume and is provided with 3 to 5 circular openings 2, each having a cross section of 1 mm². Designated by 4 is a seal portion. The bag 1 containing the food 3 is placed in an electronic oven and heated. The bag 1 may be placed at any position in the electronic oven. The bag 1 becomes inflated (FIG. 1(b)) and the steam is allowed to blow off through the openings 2 during the electronic oven heating. When the heating is stopped after the steam is allowed to blow off through the openings 2 for a period of 5 to 10 seconds, the food is ready for eating and the cooking is completed.

(2) An example of a cup

In the case of a cup, the principle is the same as in the case of the bag described above. A lid 6 of polystyrene is rigidly secured to the cup 5 at a seal portion 4. A groove 7 is formed at an outer peripheral portion of the lid 6. A steam controlling opening 2 is formed at the center of the lid 6.

Food 3 for cooking is placed in the cup 5 (FIG. 2(a)), and thereafter heated by the electronic oven. The lid 6 is inflated to a semispherical form by the internal pressure of the steam released from the food 3 (FIG. 2(b)), and the steam is allowed to blow off through the opening 2. For the cup-shaped containers, the existence of the groove 7 shown in FIG. 3(a) made the inflation smooth. The heating is stopped after lapse of a period of 5 to 10 seconds, and thereby delicious cooked food ready for eating can be obtained.

There may be used a double cup construction comprising an outer cup of formed polystyrene and an inner cup of a heat-resistant synthetic resin or paper for oil and moisture absorption. The outer cup protects the hand from the hot food when it is immediately removed from the electronic oven after cooking. As shown in FIG. 3(b), there may further be employed a double cup comprising an inner cup 5' and an outer cup 5, wherein drippings can be collected in the space between the cups, to be removed when the lid is inflated to a semispherical form. Furthermore, though the cost is increased, a paper cup can be used as the inner cup, which has moisture- and oil-absorptive paper or thick nonwoven fabric bonded on the bottom portion thereof.

(3) An example of a tray

Figure 4A:
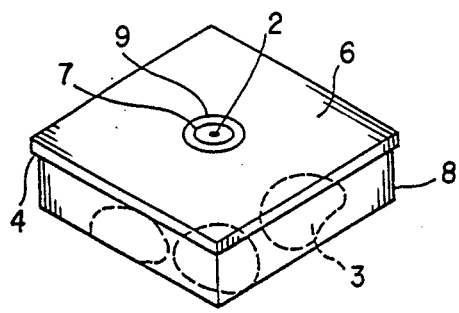
FIG. 4(a) is a schematic perspective view showing a tray-shaped food receptacle for electronic oven cooking of the present invention before cooking.
Figure 4B:
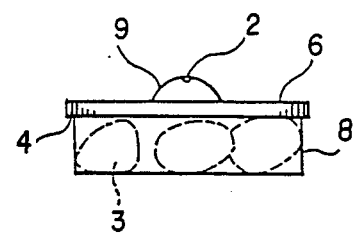
FIG. 4(b) is a schematic side view showing a tray-shaped food receptacle for electronic oven cooking of the present invention during and after cooking.
Figure 14:
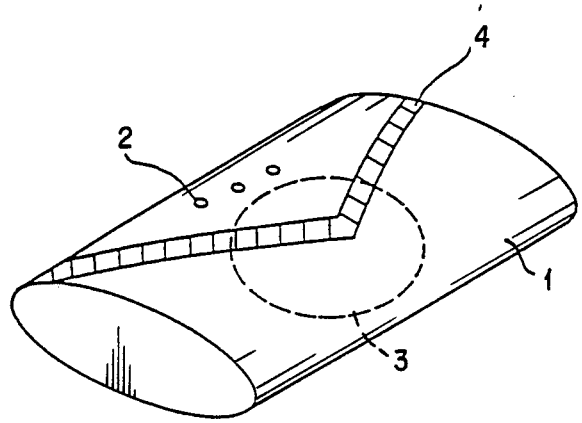
FIG. 14 is a schematic perspective view showing a bag-shaped food receptacle of the present invention.

A similar lid 6 as that for the cup is provided after food 3 for cooking is placed in a tray 8. A steam controlling opening 2 is formed in the center portion of the lid 6 (FIG. 4(a)). A cap 9 provided at the center portion of the lid 6 is inflated by the steam generated from the packed food 3 (FIG. 4(b)), and the steam is allowed to blow off through the opening 2. Designated by 4 is a seal portion and designated by 7 is a groove. The heating is stopped after a period of 5 to 10 seconds, and thereby delicious cooked food ready for eating can be obtained.

(4) An example of a bag including a tray

Figure 5A:
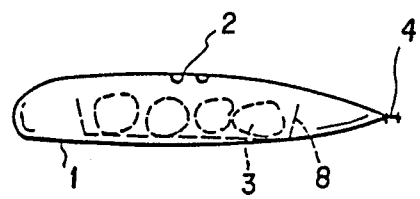
FIG. 5(a) is a schematic side view showing a bag-shaped food receptacle for electronic oven cooking of the present invention before cooking, which contains a tray.
Figure 5B:
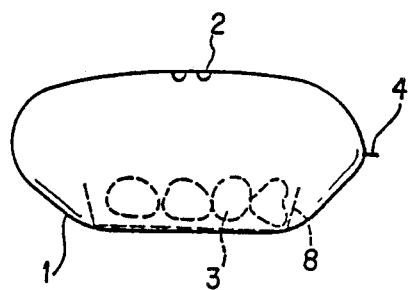
FIG. 5(b) is a schematic side view showing a bag-shaped food receptacle for electronic oven cooking of the present invention during and after cooking, which contains a tray.
Figure 5C:
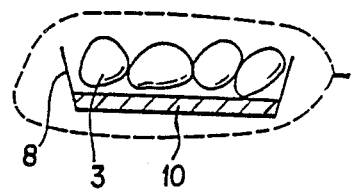
FIG. 5(c) is a schematic sectional side view, showing a bag-shaped food receptacle for electronic oven cooking of the present invention which contains a tray provided with moisture-and oil-absorptive paper on the bottom thereof.

Food 3 contained in a tray 8 is placed in a similar bag 1 having openings 2 as described in paragraph (1) above (FIG. 5(a)), and heated in the electronic oven, whereby a similar cooked food as described in paragraph (1) can be obtained (FIG. 5(b)). This type of container is convenient for eating the food 3, since the food 3 is placed in the tray 8. Moisture- and oil-absorptive paper 10 may be provided on the bottom of the tray 8 if necessary.

(5) An example of a bag contained in a cup

Figure 6A:
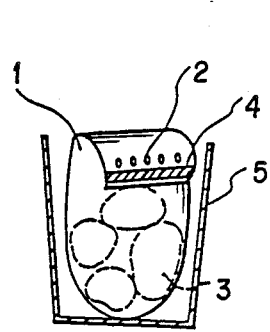
FIG. 6(a) is a schematic side view, partly in section showing a bag-shaped food receptacle for electronic oven cooking of the present invention before cooking, which is placed in a cup.
Figure 6B:
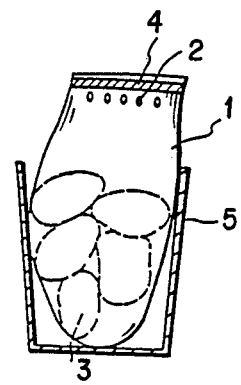
FIG. 6(b) is a schematic side view, partly in section showing a bag-shaped food receptacle for electronic oven cooking of the present invention during and after cooking, which is placed in a cup.

A bag 1 containing food 3 for cooking described in paragraph (1) above is placed in a cup 5, and the portion of the bag 1 protruding from the upper portion of the cup 5 is folded. Thereafter, an outer sealing package (not shown) is wrapped around the cup. Before heating in the electronic oven, the outer package is broken. The folded portion of the bag 1 is protruded out of the cup 5 (FIG. 6(b)) during heating and the bag 1 becomes inflated. It is preferable to use a single cup 5. Thus, the same result as described in the above paragraph (1) can be obtained and the food can be eaten immediately after being cooked in the electronic oven.

EXAMPLE 5

As noted above, the food receptacle of the present invention, designed to adjustably maintain the pressure and temperature in the receptacle during cooking to a range of 1.00 to 1.15 atm and 100° to 105° C., respectively, provides good quality cooked food. To evaluate the effect of pressure and temperature outside of these ranges of values, bag-type food receptacles were fabricated in accordance with the present invention, using the materials indicated on Table 2 below, wherein the pressure and temperature were purposely maintained higher than these values.

Table 2 summarizes the results of four different types of food stored at −25° C. and heated in a microwave oven under the indicated conditions. The food receptacles had either one or two steam-controlling openings, each of 0.7 mm. diameter.

It can be seen that with a pressure of 1.3 atm. and a temperature of 107° C. which are values higher than the preferred ranges, the foods cooked in the receptacles were of poor quality.

TABLE 2

| Kind of cooked food | | Number of controlling openings | Heating time in electronic oven (seconds) | In receptacle Temp. °C. | press. atm | Blow-off time seconds | Result | Taste of Cooked food |
|---|---|---|---|---|---|---|---|---|
| Chicken Nuggets | A | 2 | 130 | 107 | 1.3 | 10 | X | Water & oil attached to the surface-coating, |
| | B | 1 | 120 | bag is broken | | | | |
| A bite size cutlet | A | 2 | 130 | 107 | 1.3 | 10 | X | Water & oil attached to the surface-coating, The greater part of the coating comes off |
| Shao-mai | A | 2 | 120 | 107 | 1.3 | 10 | X | Surface-coating has become soft and molten. Sticky within a mouth. |
| Meat spaghetti | A | 2 | 180 | 107 | 1.3 | 10 | X | Firmness of noodles lost. Too soft as a whole. |

In the table, all of cooked foods are cold type stored at −25° C. Result: o: good, Δ: fair, X: poor
Used receptacle: Bag prepared from laminated film consisting of outer layer: PET 12μ of thickness, intermediate layer: PE 20μ, and inner layer: PE 25μ. Diameter of the controlling openings: 0.7 mm. They are heated under higher temperature and higher pressure.

EXAMPLE 6

In Examples 1–3 above, food receptacles having 3–6 steam controlling openings were used. To evaluate the effect upon the quality of the cooked food of a lesser number of openings, bag-type receptacles were fabricated from laminated film having the same construction as in Example 5 above. The bags were provided with one or two steam-controlling openings, each 1.4 mm. in diameter.

Different foods were packed in the bags, and stored at 25° C. Cooking conditions of heating time and steam blow-off time were varied to produce temperatures and pressures in the bags which are lower than the preferred values indicated above. Table 3 below summarizes the cooking conditions and the resulting quality of the cooked food.

As shown in Table 3, if the pressure and temperature within the receptacle during heating are maintained within the range of 1.00–1.05 atm. and 100°–105° C., respectively, a receptacle having one or two openings provide good results which are similar to a receptacle having 3 to 6 openings.

In contrast, if the temperature and pressure in the receptacle during cooking are outside the aforesaid ranges of optimal values, the results are not good. For example, the cooked food may have some cold portions. Also, as shown in Table 2, the use of temperatures and pressures higher than the aforesaid ranges results in cooked food which was not satisfactory.

TABLE 3

| Kind of cooked food | | Number of controlling openings | Heating time in electronic oven (seconds) | In receptacle Temp. °C. | press. atm | Blow-off Time seconds | result | Taste of Cooked food |
|---|---|---|---|---|---|---|---|---|
| Chicken Nuggets | A | 1 | 110 | 102 | 1.074 | 3 | o | good |
| Green soybeans | A | 2 | 95 | 98 | 0.931 | — | X | some parts were cold |
| | B | 2 | 105 | 101 | 1.036 | 5 | o | good |
| A bite size cutlet | A | 1 | 85 | 99 | 0.965 | — | X | some parts were cold |
| | B | 1 | 95 | 102 | 1.074 | 5 | o | good |
| pilaff | A | 2 | 120 | 99 | 0.965 | — | X | some parts were cold |
| | B | 2 | 130 | 103 | 1.108 | 5 | o | good |
| Takoyaki (octopus pudding) | A | 2 | 95 | 98 | 0.931 | — | X | Some parts were cold |
| | B | 2 | 105 | 102 | 1.074 | 3 | o | good |
| Hot | A | 2 | 30 | 99 | 0.965 | — | X | some parts were cold |

TABLE 3-continued

| Kind of cooked food | | Number of controlling openings | Heating time in electronic oven (seconds) | In receptacle Temp. °C. | press. atm | Blow-off Time seconds | result | Taste of Cooked food |
|---|---|---|---|---|---|---|---|---|
| cake | B | 2 | 40 | 102 | 1.074 | 3 | o | good |

In the table, all of cooked foods are cold type stored at −25° C. Result: o: good, Δ: fair, X: poor
Used receptacle: Bag prepared from laminated film consisting of outer layer: PET 12μ of thickness, intermediate layer: PE 20μ, and inner layer: PE 25μ. Diameter of the controlling openings: 1.4 mm. They are heated under higher temperature and higher pressure.

In the embodiments described above, the cooking is complete after the steam is allowed to blow off through the controlling opening for a period of 5 to 10 seconds, and the inflation of the receptacle induced by internally pressurized steam can be visually observed. Therefore, the completion of the cooking can be easily confirmed and the function as "watchman of electronic oven cooking" can be achieved.

To enhance the commercial value of the packaged foods, the receptacle of the present invention can further be constituted as follows:

(1) With respect to the bag, it is preferable to use the above-mentioned particular three layer film comprising the inner layer of perforated polyethylene film, the intermediate layer of moisture- and oil-absorptive paper or nonwoven fabric and the outer layer of PET resin film, to absorb free moisture and oil released from the food. Particularly, in the case of a sponge cake which releases a small amount of free moisture and oil, the laminated film is designed by considering only heat resistance.

(2) With respect to the tray, free moisture and oil can be removed by using thick nonwoven fabric inside the tray.

(3) With respect to the cup, there can be used a double cup comprising an outer cup of foamed polystyrene and an inner cup of a heat-resistant synthetic resin, permitting the food in the cup to be eaten immediately after being cooked in the electronic oven. The inner cup may be provided with a groove so as to collect the moisture and oil dropped from the distended semispherical portion which acts as an indicator that cooking is completed. Further, the paper cup can be used as in the inner cup, which has moisture- and oil-absorptive nonwoven fabric provided on the bottom portion thereof, thereby absorbing free moisture and oil.

Thus, delicious cooked foods can be satisfactorily obtained from all type of foods by the electronic oven cooking of a chilled type or a cold type such as chicken nuggets, green soybeans, small size pork cutlets, pilaff, takoyaki (octopus pudding) and hot cake.

As described above, the present invention relates to the food receptacle for electronic oven cooking which comprises a steam controlling opening for allowing steam to blow off therethrough when an internal pressure in the receptacle is increased beyond a certain value by the steam generated during electronic oven heating of the food. The internal pressure in the receptacle can be adjustably maintained within the range of about 1.00 to about 1.15 atm and the temperature in the receptacle can be adjustably maintained within the range of about 100° to about 105° C. Further, the receptacle is inflatable by the increased internal pressure. The steam is allowed to blow off through the steam controlling opening for a period of not more than about 10 seconds, and thereafter, the heating is stopped.

By these features, the following advantages are obtained:

(1) Before the electronic oven cooking, it is not necessary to thaw the frozen foods. Particularly, in the receptacle constituted by the laminate of three layers, the balance between oil and moisture can be maintained and the cooking time is adjustable by the evaporated steam controlling opening according to the kinds of the foods. Further, the puncture of the receptacle can be avoided and the flavor of the food can be sufficiently maintained. Furthermore, since there is no leaking of oil or moisture from the receptacle after the electronic oven cooking, it can be held by hand without soiling the hand.

(2) All the foods for cooking which moisture contents are not more than 70% can be satisfactorily cooked by the electronic oven.

(3) Without being influenced by the types and the functions of the electronic ovens, the excellent food can be satisfactorily cooked.

(4) The functions of the electronic ovens can be fully utilized and the foods can be cooked for a short period of time.

(5) The completion of the cooking can be observed by the inflation of the receptacle after the elapse of not more than 10 seconds, particularly 3 to 10 seconds. Therefore, it is very convenient as an indication that cooking is complete and anybody can quickly cook the foods with ease.

(6) Further, there can be easily fabricated an apparatus which stops the electronic oven after elapse of 3 to 10 seconds by detecting the steam allowed to blow off through the steam controlling opening formed on the receptacle. In addition, this operation can be associated with a buzzer, a color lamp and the like. Accordingly, the electronic oven can be easily operated.

(7) The structure of the receptacle itself is extremely simple. Therefore, its manufacture and treatment are easy, inexpensive and economical.

(8) According to this receptacle, the distribution mechanism of the foods is improved, from the distribution of cold foods to that of foods at ordinary temperature. For example, when the dry packing and the retort pouching are carried out by using a heat-resistant resin and the winding method in canning is substituted for the method in which the resin is pressed in contact, new commodities cookable by the electronic oven heating can be circulated at ordinary temperature, by being accompanied by lids provided with the steam controlling opening.

What is claimed is:

1. A food receptacle for electronic oven cooking of food, the receptacle being transparent to microwave energy and composed of a heat-resistant synthetic resin impermeable to oil and moisture and having between one to six steam-controlling openings formed in and extending through the thickness of the receptacle, from the inside to the outside, the receptacle being inflatable with increase of the internal pressure induced by the steam generated during heating of the food, up to a predetermined pressure when the steam is vented through said openings, the size of each opening having a diameter of 0.5 to 2.0 mm/300 cc. of receptacle volume, and the number and size of the opening being selected such that the internal pressure in the receptacle is adjustably maintained in a range of about 1.01 to 1.15 atm. and the temperature in the receptacle is adjustably maintained in a range of about 100° to about 105° C. by the steam generated during the electronic oven heating of the food and such that the inflation of the receptacle is observable and provides a visual indication that cooking is complete when the steam has vented through the openings for a predetermined time.

2. A food receptacle for electronic oven cooking according to claim 1, wherein said receptacle is prepared from a laminated sheet comprising an outer layer of a heat-resistant synthetic resin film not permeable to oil and moisture, an intermediate layer of paper or nonwoven fabric having oil and moisture absorptive properties, and an inner layer of a heat-resistant synthetic resin film having at least one small first perforation through which oil and moisture released from the food during heating are allowed to pass outside by the capillary phenomenon.

3. A food receptacle according to claim 2, wherein said intermediate layer has at least one small second perforation therein to enhance the capillary flow through said inner layer.

4. A food receptacle for electronic oven cooking according to claim 1, wherein said receptacle is prepared from a laminated sheet comprising an outer layer of a heat-resistant synthetic resin film not permeable to oil and moisture, and an inner layer of nonwoven fabric having oil and moisture absorptive properties.

* * * * *